(12) United States Patent
Gupta et al.

(10) Patent No.: US 12,375,910 B2
(45) Date of Patent: Jul. 29, 2025

(54) METHOD AND SYSTEM OF ENABLING AKMA SERVICE IN ROAMING SCENARIO

(71) Applicant: Samsung Electronics Co., Ltd., Suwon-si (KR)

(72) Inventors: Varini Gupta, Bangalore (IN); Rajavelsamy Rajadurai, Bangalore (IN); Nivedya Parambath Sasi, Bangalore (IN); Lalith Kumar, Bangalore (IN); Narendranath Durga Tangudu, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 17/563,659

(22) Filed: Dec. 28, 2021

(65) Prior Publication Data

US 2022/0210636 A1  Jun. 30, 2022

(30) Foreign Application Priority Data

Dec. 29, 2020  (IN) .............................. 202041056987
Dec. 9, 2021  (IN) .............................. 202041056987

(51) Int. Cl.
  *H04L 29/06* (2006.01)
  *H04W 8/12* (2009.01)
  (Continued)

(52) U.S. Cl.
  CPC ......... *H04W 12/0431* (2021.01); *H04W 8/12* (2013.01); *H04W 12/03* (2021.01); *H04W 12/06* (2013.01); *H04W 60/04* (2013.01)

(58) Field of Classification Search
  CPC . H04W 12/0431; H04W 12/03; H04W 12/06; H04W 8/12; H04W 60/04
  See application file for complete search history.

(56) References Cited

U.S. PATENT DOCUMENTS

2020/0068391 A1*  2/2020  Liu .................... H04W 12/06
2020/0084676 A1   3/2020  Ben Henda et al.
(Continued)

FOREIGN PATENT DOCUMENTS

WO  2020145064 A1  7/2020
WO  2020152087 A1  7/2020

OTHER PUBLICATIONS

Examination report dated Aug. 25, 2022, in connection with Indian Application No. 202041056987, 5 pages.
(Continued)

*Primary Examiner* — Joseph P Hirl
*Assistant Examiner* — Chi D Nguy

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a method of enabling authentication and key management application (AKMA) services in roaming mode comprising generating a key associated with the AKMA services after a primary authentication of the UE with a wireless network; determining whether to share the at least one key associated with the AKMA services with a visited AKMA anchor function (vAAnF); and sharing the at least one key associated with the AKMA services with the vAAnF.

12 Claims, 12 Drawing Sheets

(51) Int. Cl.
    *H04W 12/03*     (2021.01)
    *H04W 12/0431*     (2021.01)
    *H04W 12/06*     (2021.01)
    *H04W 60/04*     (2009.01)

(56) References Cited

U.S. PATENT DOCUMENTS

| | | | | |
|---|---|---|---|---|
| 2021/0409952 | A1* | 12/2021 | Jost | H04W 12/106 |
| 2022/0191694 | A1* | 6/2022 | Rajput | H04W 48/16 |
| 2022/0368684 | A1* | 11/2022 | You | H04L 63/062 |
| 2022/0417010 | A1* | 12/2022 | De Kievit | H04L 9/3242 |

OTHER PUBLICATIONS

International Search Report and Written Opinion of the International Searching Authority dated Apr. 6, 2022, in connection with International Application No. PCT/KR2021/020125, 9 pages.
3GPP TS 33.535 V17.0.0 (Dec. 2020), Technical Specification, 3rd Generation Partnership Project; Technical Specification Group Services and System Aspects; Authentication and Key Management for Applications (AKMA) based on 3GPP credentials in the 5G System (5GS) (Release 17), Dec. 2020, 20 pages.
Huawei, et al., "Adding details of AKMA application key generation in the UE," S3-203482 revision of S3-202963, 3GPP TSG-SA3 Meeting #101e, e-meeting, Nov. 9-20, 2020, 3 pages.
Samsung, et al., "Handling of KAUSF upon successful primary authentication," S3-203251, 3GPP TSG-SA3 Meeting #101-e, e-meeting, Nov. 9-20, 2020, 13 pages.

* cited by examiner

METHOD AND SYSTEM OF ENABLING AKMA SERVICE IN ROAMING SCENARIO

CROSS REFERENCES TO RELATED APPLICATIONS

This application is based on and claims priority under 35 U.S.C. § 119(a) of an Indian Provisional patent application number 202041056987 filed on Dec. 29, 2020, in the Indian Patent Office, and of an Indian Non-Provisional patent application number 202041056987, filed on Dec. 9, 2021, in the Indian Patent Office, the disclosure of each of which is incorporated by reference herein in its entirety.

BACKGROUND

1. Field

The present disclosure relates to communication systems, and more specifically to a method and a system for enabling an authentication and key management for applications (AKMA) services in a roaming scenario.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, 3rd generation partnership project (3GPP) has specified AKMA feature in Release-17, which allows a 3rd party application to use 3GPP credentials to protect communication between a user equipment (UE) and an application server.

FIG. 1 is a signaling diagram illustrating representation of AKMA key generation and distribution among 3GPP Network Functions, according to the prior art.

Referring to the FIG. 1 consider a conventional methods and systems, after a successful primary authentication of the user (USIM), AUSF and mobile equipment (ME) hosting USIM derive KAKMA and A-KID from KAUSF. AUSF registers A-KID, KAKMA, and SUPI into AAnF.

KAF is generated in ME from KAKMA and application function (AF) identity (e.g., an FQDN) which may be pre-configured in the UE. On the network side, KAF is similarly generated in AAnF, upon request from the AF, which provides AAnF with an identity (e.g., FQDN) and A-KID. AF receives A-KID from UE over Ua* signaling connection. AF is the anchor for 3rd party application and interfaces with 3GPP core (AAnF) either directly (when AF is hosted by Operator himself), or indirectly via network exposure function (NEF).

The mentioned functionality of the AKMA services is currently limited to a "home-network" of the user and gets disabled when the user is roaming.

Thus, it is desired to address the above mentioned disadvantages or other shortcomings or at least provide a useful alternative.

The principal object of the embodiments herein is to provide a method and system of enabling authentication and key management for applications (AKMA) services in roaming in wireless networks.

SUMMARY

Accordingly, the embodiment herein is to provide a method and system of authentication and key management for applications (AKMA) services in roaming in wireless networks. The provided method describes sharing of AKMA key material (AKMA application key and/or AKMA anchor key) with AKMA anchor functions in visited network, by entities in the home network by way of push mechanisms, e.g., notifications. Further, the provided method describes retrieval of AKMA key material (AKMA application key and/or AKMA anchor key) by AKMA anchor functions in visited network by way of pull mechanisms, from entities in the home network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
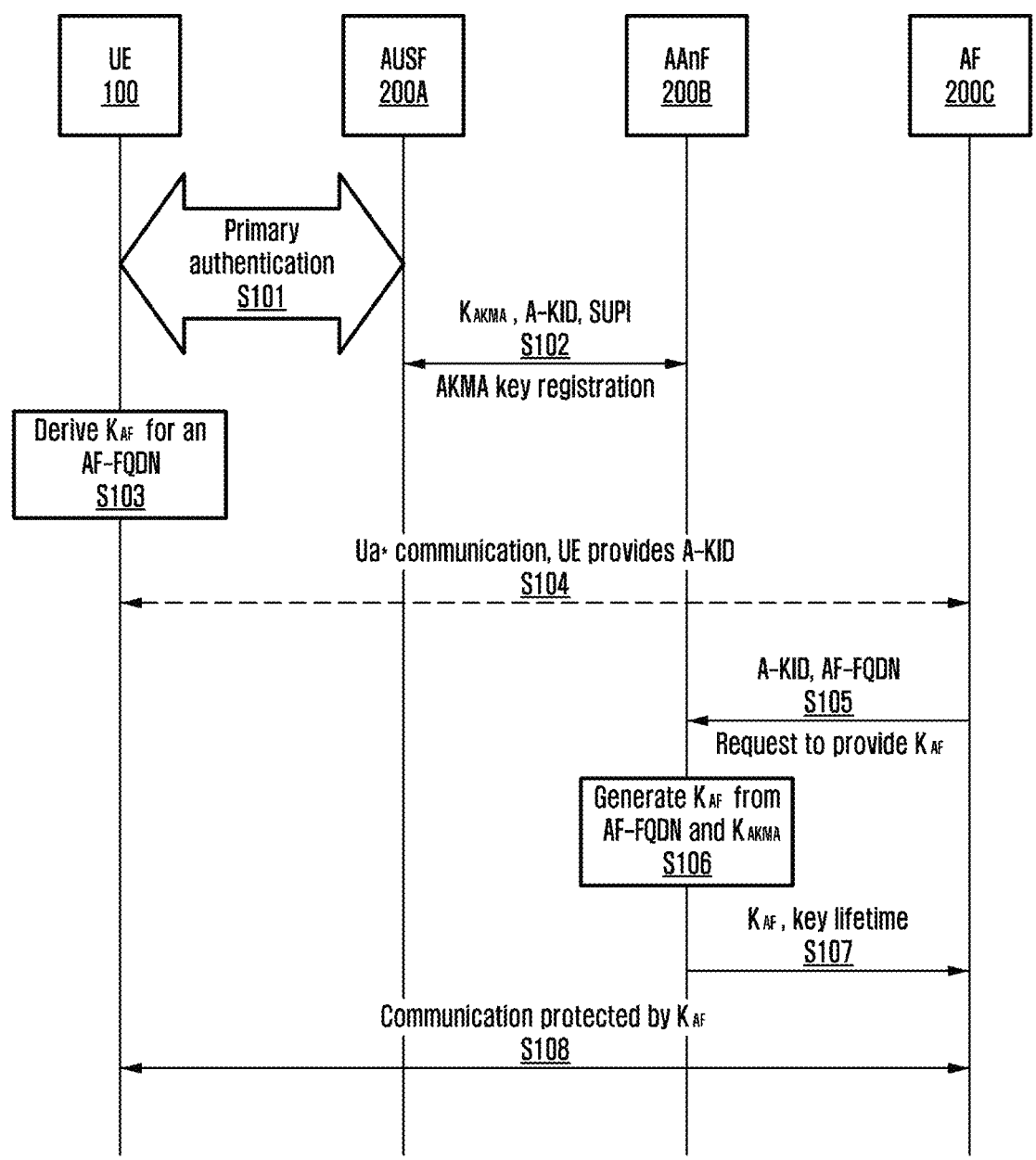
FIG. 1 is a signaling diagram illustrating representation of AKMA key generation and distribution among 3GPP network functions according to the prior art.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Below are the abbreviations used in the description:
AMF—access and mobility management function;
UE—user equipment;
UDM—unified data management;
NRF—network repository function;
3GPP—3rd generation partnership project;
ME—mobile equipment;
AKMA—authentication and key management for applications;
AUSF—authentication server function;
AAnF—AKMA anchor function;
USIM—universal subscriber identity module;
SUPI—subscription permanent identifier;
AF—application function;
URL—uniform resource locator;
HTTP—hyper-text transfer protocol;
PLMN—public land mobile network;
H-PLMN—home-public land mobile network;
V-PLMN—visited-public land mobile network;
A-KID—AKMA key identifier;
KAKMA—AKMA anchor key;
KAF—AKMA application key;
NEF—network exposure function;
LI—lawful interception;
SN—serving network;
HN—home network; and
Roaming mode—a UE is in a network different from a home-network of the UE.

AKMA, derives security keys from KAUSF that in most cases can be used for encryption (for example, derivation of further keys from KAUSF for communication protection (encryption and/or integrity protection)) across the serving-PLMN. This means that a user can even establish an encrypted tunnel with home-PLMN when the user is roaming. That is, a user can connect to a server outside of V-PLMN, communicate with the server using keys negotiated with the user's H-PLMN, and V-PLMN may have no means to understand this communication, as the user does not have keys that were used to protect the communication.

This prevents a lawful interception (LI) from taking place in the VPLMN as required. For encryption, which the MNO has been involved in establishing, there is LI requirement to provide either decrypted traffic or the means for law enforcement to decrypt the traffic. This requirement applies to mechanisms such as AKMA, where the MNO is involved in establishing and distributing key material for encryption.

Additionally, when roaming, the LI needs to be possible to perform without explicit support from the HPLMN, that is, HPLMN may not know that the HPLMN's roaming subscriber is the LI target in the VPLMN. Due to above LI requirements, AKMA has currently been restricted as an H-PLMN only functionality. That is, AKMA functionality is not available when user is roaming.

The method in the present disclosure provides multiple methods by which AKMA functionality can be supported when user is roaming.

Accordingly, the embodiment herein is to provide a method and system of authentication and key management for applications (AKMA) services in roaming in wireless networks. The provided method describes sharing of AKMA key material (AKMA application key and/or AKMA anchor key) with AKMA anchor functions in visited network, by entities in the home network by way of notifications. Further, the method in the present disclosure provides retrieval of AKMA key material (AKMA application key and/or AKMA anchor key) by AKMA anchor functions in visited network, from entities in the home network.

In an embodiment, based on the configuration (configuration considering the regional regulatory requirements/policies) provided by the home network (HN), the UE construct the A-KID using the MNC and MCC of the home PLMN or the serving PLMN. Then, based on the received A-KID from the UE, the AF discovers the AAnF either in the visited network or in the Home Network.

In an embodiment, based on the configuration (configuration considering the regional regulatory requirements/policies) provided by the serving network (SN), the UE construct the A-KID using the MNC and MCC of the home PLMN or the serving PLMN. Then, based on the received A-KID from the UE, the AF discovers the AAnF either in the visited network or in the home network.

In an embodiment, based on the configuration (configuration considering the regional regulatory requirements/policies) provided by the verticals (for example, edge configuration server), the UE construct the A-KID using the MNC and MCC of the home PLMN or the serving PLMN. Then, based on the received A-KID from the UE, the AF discovers the AAnF either in the visited network or in the home network.

In an embodiment, the UE provides the details of both HPLMN and serving PLMN details to the AF. In an embodiment, the AF uses the PLMN ID of the serving PLMN to discover the vAAnF and the vAAnF uses the PLMN-ID of the HPLMN to discover the hAAnF.

Throughout the description, embodiments provided in one solution can be used with embodiments provided in other solution to arrive at final solution to support AKMA in roaming.

Referring now to the drawings, and more particularly to FIGS. 2A through 9, there are shown preferred embodiments.

Figure 2A:
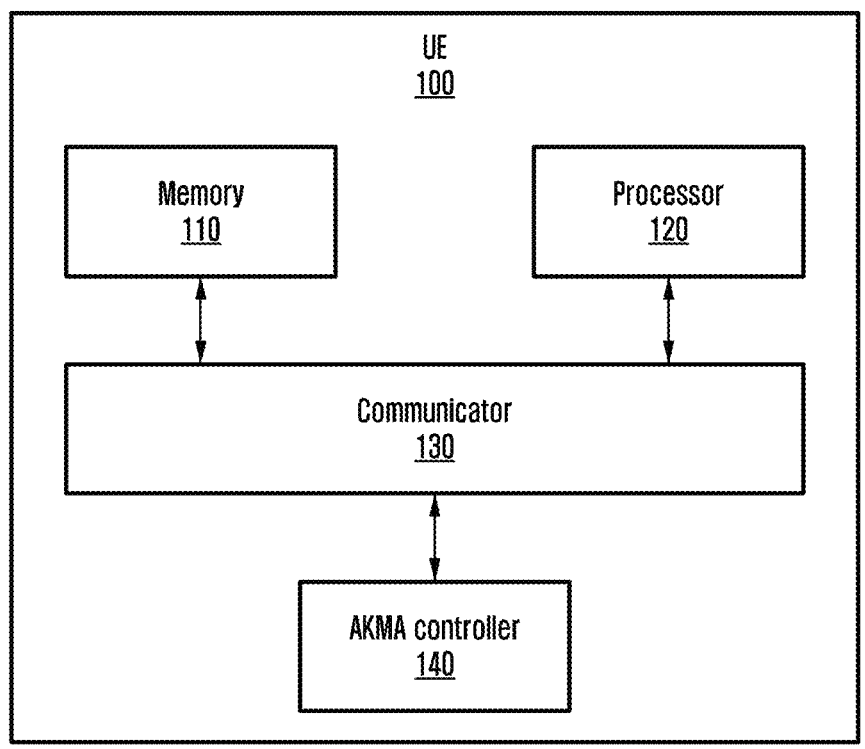
FIG. 2a illustrates a block diagram of a UE, for enabling AKMA services, in a roaming mode of the UE, according to an embodiment as disclosed herein.

FIG. 2A illustrates a block diagram of a user equipment (UE) (100) for enabling authentication and key management for applications (AKMA) services, while the UE (100) is in a roaming mode in a wireless network, according to an embodiment as disclosed herein.

Examples of the UE (100) include, but are not limited to a smartphone, a tablet computer, a personal digital assistance (PDA), an Internet of Things (IoT) device, a wearable device, etc. Furthermore, the UE (100) includes an application entity (101), an AKMA entity (102), and a NAS entity (103) (not shown in FIG. 2A).

In an embodiment, a user using the UE (100) is moving from a home network to a roaming network and wants to communicate with an application function (AF) to consume services.

In an embodiment, the UE (100) includes a memory (110), a processor (120), a communicator (130), and an AKMA controller (140).

In an embodiment, the memory (110) is configured to store an AKMA anchor (KAKMA) key and a lifetime of the KAKMA and an AKMA key identifier (A-KID) and an AKMA application key (KAF), and a lifetime of the KAF. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in random access memory (RAM) or cache). The memory (110) can be an internal storage unit or the memory can be an external storage unit of the UE (100), a cloud storage, or any other type of external storage.

The processor (120) communicates with the memory (110), the communicator (130), and the AKMA controller (140). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g., UDM, server, etc.) via one or more networks (e.g., Radio technology). The communicator (130) includes an electronic circuit specific to a standard that enables wired or wireless communication.

The AKMA controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AKMA controller (140) establishes communication with an application function (AF) server using the AKMA application key (KAF). Further, the UE (100) performs a primary authentication with an authentication server function (AUSF) (200A). Further, the AKMA controller (140) generates the KAKMA and the A-KID from an AUSF key (KAUSF). Further, the AKMA controller (140) generates the KAF using the KAKMA and an AF-Identity (AF-ID) to access an application hosted by the AF server (200C). Further, the AKMA controller (140) establishes the communication with the AF server (200C) to access the application hosted by the AF server (200C), where the UE (100) sends the A-KID to the AF server (200C) over the established communication. The AUSF (200A) derives the KAKMA and the A-KID from the KAUSF, and where the AUSF (200A) registers the KAKMA, the A-KID, and subscription permanent identifier (SUPI) into an AKMA anchor function (AAnF) server (200B1 or 200B2).

Although the FIG. 2A shows various hardware components of the UE (100) but it is to be understood that other embodiments are not limited thereon. In other embodiments, the UE (100) may include less or more number of components. Further, the labels or names of the components are used only for illustrative purpose and does not limit the scope of the present disclosure. One or more components can be combined to perform the same or substantially similar function to enabling the AKMA service, while the UE (100) in roaming.

Figure 2B:
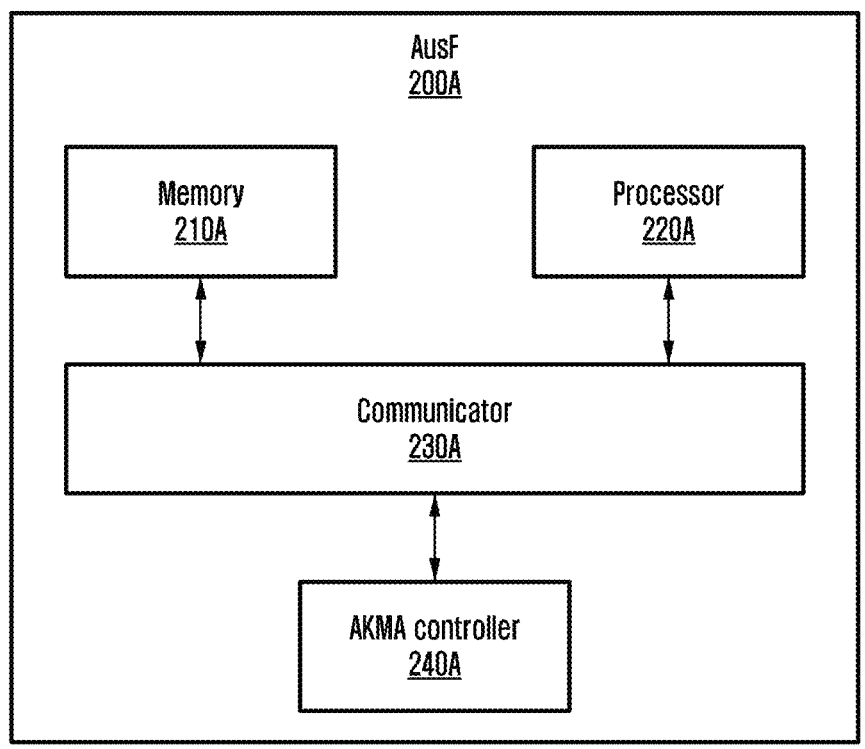
FIG. 2b illustrates a block diagram of a AUSF for enabling AKMA services in a roaming mode of the UE according to an embodiment as disclosed herein.

FIG. 2B illustrates a block diagram of the AUSF server (200A) for enabling the AKMA services while the UE (100) is in roaming in the wireless network according to an embodiment as disclosed herein.

In an embodiment, the AUSF server (200A) includes a memory (210A), a processor (220A), a communicator (230A), and an AKMA controller (240A).

In an embodiment, the memory (210A) is configured to store an AKMA anchor (KAKMA) key and an AKMA Key Identifier (A-KID) and an AKMA application key (KAF), and a lifetime of the KAF. The memory (210A) stores instructions to be executed by the processor (210A). The memory (210A) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210A) may, in some examples, be considered a non-transitory storage medium. The term "non-transitory" may indicate that the storage medium is not embodied in a carrier wave or a propagated signal. However, the term "non-transitory" should not be interpreted that the memory (210A) is non-movable. In some examples, the memory (210A) can be configured to store larger amounts of information than the memory. In certain examples, a non-transitory storage medium may store data that can, over time, change (e.g., in Random Access Memory (RAM) or cache). The memory (210A) can be an internal storage unit or the memory can be an external storage unit of the AUSF server (200A), a cloud storage, or any other type of external storage.

The processor (220A) communicates with the memory (210A), the communicator (230A), and the AKMA controller (240A). The processor (220A) is configured to execute instructions stored in the memory (210A) and to perform various processes. The processor (220A) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230A) is configured for communicating internally between internal hardware components and with external devices (e.g., AAnF server, UDM, server, etc.) via one or more networks. The communicator (230A) includes an electronic circuit specific to a standard that enables wired or wireless communication.

The AKMA controller (240A) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may be, for example, be embodied in one or more semiconductor chips, or on substrate supports such as printed circuit boards and the like.

In an embodiment, the AKMA controller (240A) establishes communication with an AKMA anchor function (AAnF). Further, the AUSF (200A) performs a primary authentication with the UE (100). Further, the AKMA controller (140) generates the KAKMA and the A-KID from an AUSF key (KAUSF). The AUSF (200A) derives the KAKMA and the A-KID from the KAUSF, and where the AUSF (200A) registers the KAKMA, the A-KID, and subscription permanent identifier (SUPI) into an AKMA anchor function (AAnF) server (200B1 or 200 B2).

In an embodiment, the AKMA controller (240A) receives a first AKMA indication "AKMA indication 1" from a unified data management (UDM) (200D), indicating whether the KAKMA, the A-KID needs to be generated for the UE (100). Based on the first AKMA indication, the AKMA controller (240A) generates the KAKMA and the A-KID.

In an embodiment, the AKMA controller (240A) receives a second AKMA indication "AKMA indication 2" from the UDM specifying whether the KAKMA and the A-KID and/or the KAF Keys need to be propagated to a Visited-PLMN, depending on operator agreements and/or AKMA support in the VPLMN.

Although the FIG. 2B shows various hardware components of the AUSF server (200A) but it is to be understood that other embodiments are not limited thereon. In other embodiments, the AUSF server (200A) may include less or more number of components. Further, the labels or names of the components are used only for illustrative purpose and does not limit the scope of the present disclosure. One or more components can be combined to perform the same or substantially similar function to enabling the AKMA service, while the UE (100) in roaming.

Figure 2C:
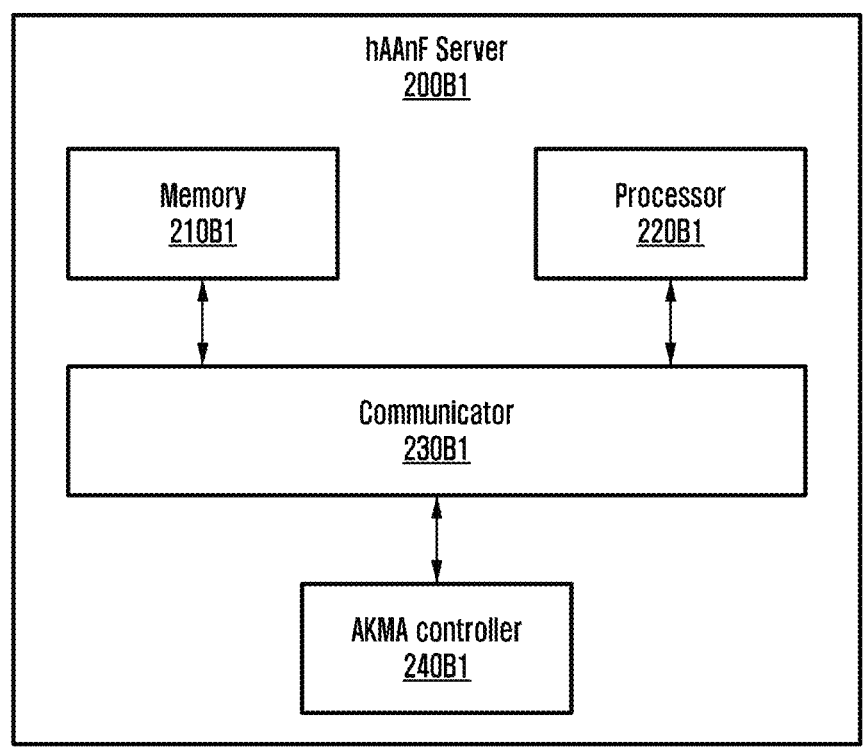
FIG. 2c illustrates a block diagram of a hAAnF server, for enabling AKMA services, in a roaming mode of the UE, according to an embodiment as disclosed herein.

FIG. 2C illustrates a block diagram of the home AAnF (hAAnF) server (200B1) for enabling the AKMA services while the UE (100) is in roaming in the wireless network, according to an embodiment as disclosed herein.

In an embodiment, the hAAnF server (200B1) includes a memory (210B1), a processor (220B1), a communicator (230B1), and an AKMA controller (240B1).

In an embodiment, the memory (210B1) is configured to store the KAKMA, the lifetime of KAKMA, the KAF, the A-KID, and the lifetime of the KAF. The memory (210B1) stores instructions to be executed by the processor (220B1). The memory (210B1) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210B1) may, in some examples, be considered a non-transitory storage medium. The term "non-transitory" may indicate that the storage medium is not embodied in a carrier wave or a propagated signal. However, the term "non-transitory" should not be interpreted that the memory (210B1) is non-movable. In some examples, the memory (210B1) can be configured to store larger amounts of information than the memory. In certain examples, a non-transitory storage medium may store data that can, over time, change (e.g., in random access memory (RAM) or cache). The memory (210B1) can be an internal storage unit or the memory can be an external storage unit of the AAnF server (200B1), a cloud storage, or any other type of external storage.

The processor (220B1) communicates with the memory (210B1), the communicator (230B1), and the AKMA controller (240B1). The processor (220B1) is configured to execute instructions stored in the memory (210B1) and to perform various processes. The processor (220B1) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (230B1) is configured for communicating internally between internal hardware components and with external devices (e.g., UDM, server, etc.) via one or more networks. The communicator (230B1) includes an electronic circuit specific to a standard that enables wired or wireless communication.

The AKMA controller (240B1) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AKMA controller (240B1) receives an AKMA indication "AKMA indication 2" from the AUSF (200A) specifying whether the KAKMA and the A-KID and/or the KAF Keys need to be propagated to a Visited-PLMN, depending on operator agreements and/or AKMA support in the VPLMN.

Further, the AKMA controller (240B1) selects a visited AAnF (vAAnF) instance to serve the UE (100). Further, the AKMA controller (240B1) determines that the generated KAKMA and the A-KID and/or the KAF Keys need to be propagated to the Visited-PLMN based on indication from UDM and/or local policy. Accordingly, the AKMA controller (240B1) discovers a vAAnF instance information, responsible for receiving an AKMA Key Material in the visited PLMN. The AKMA controller (240B1) uses visited network information provided by an AMF to the AUSF during registration procedure to query a NRF (200E).

The vAAnF instance information can be a notification endpoint registered by the vAAnF (200B2) in the NRF (200E). Alternatively, the information can be a new or existing service exposed by the vAAnF (200B2) for receiving the AKMA Key material containing, e.g., the KAKMA, the A-KID and the SUPI of the UE (100).

In an embodiment, the AKMA controller (240B1) registers SUPI, KAKMA and A-KID in the vAAnF (200B2). In an embodiment, the AKMA controller (240B1) sends a redirection information received from the vAAnF (200B2) to the hAAnF (200B1). Alternatively, the AKMA controller (240B1) may provide visited-network information to the hAAnF, wherein the hAAnF may discover the vAAnF (200B2) information by querying the NRF.

Although the FIG. 2C shows various hardware components of the AUSF server (200A) but it is to be understood that other embodiments are not limited thereon. In other embodiments, the hAAnF (200B1) may include less or more number of components. Further, the labels or names of the components are used only for illustrative purpose and does not limit the scope of the present disclosure. One or more components can be combined to perform the same or substantially similar function to enable the AKMA services in a roaming mode in the wireless network.

Figure 2D:
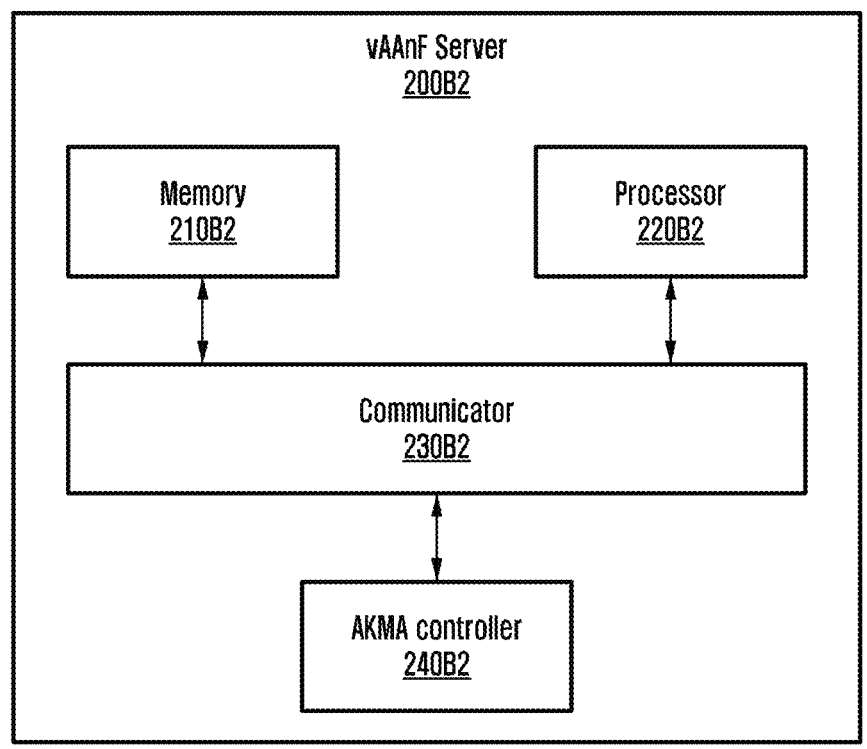
FIG. 2d illustrates a block diagram of a hAAnF server, for enabling AKMA services, in a roaming mode of the UE, according to an embodiment as disclosed herein.

FIG. 2D illustrates a block diagram of the visited AAnF (vAAnF) server (200B2) for enabling the AKMA services while the UE (100) is in roaming in the wireless network, according to an embodiment as disclosed herein.

In an embodiment, the vAAnF server (200B2) includes a memory (210B2), a processor (220B2), a communicator (230B2), and an AKMA controller (240B2).

In an embodiment, the memory (210B2) is configured to store the KAKMA, the lifetime of KAKMA, the KAF, the A-KID, and the lifetime of the KAF. The memory (210B2) stores instructions to be executed by the processor (220B2). The memory (210B2) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210B2) may, in some examples, be considered a non-transitory storage medium. The term "non-transitory" may indicate that the storage medium is not embodied in a carrier wave or a propagated signal. However, the term "non-transitory" should not be interpreted that the memory (210B2) is non-movable. In some examples, the memory (210B2) can be configured to store larger amounts of information than the memory. In certain examples, a non-transitory storage medium may store data that can, over time, change (e.g., in random access memory (RAM) or cache). The memory (210B2) can be an internal storage unit or the memory can be an external storage unit of the vAAnF server (200B2), a cloud storage, or any other type of external storage.

The processor (220B2) communicates with the memory (210B2), the communicator (230B2), and the AKMA controller (240B2). The processor (220B2) is configured to execute instructions stored in the memory (210B2) and to perform various processes. The processor (220B2) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (230B2) is configured for communicating internally between internal hardware components and with external devices (e.g., UDM, server, etc.) via one or more networks. The communicator (230B2) includes an electronic circuit specific to a standard that enables wired or wireless communication.

The AKMA controller (240B2) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AKMA controller (240B2) retrieves the AKMA key material from hAAnF (200B1). The AKMA key material may be for example the KAKMA, the A-KID and the SUPI of the UE. In an embodiment, the AKMA controller (240B2) provide a re-direction information to the AKMA controller (240B1) in response to receiving the KAKMA, the A-KID and the SUPI. The re-direction information may contain, e.g., vAAnF URL, and/or URL of a NEF in visited network, and any other information, which may be used by NEF in visited network to select the vAAnF.

Although the FIG. 2D shows various hardware components of the vAAnF server (200B2) but it is to be understood that other embodiments are not limited thereon. In other embodiments, the vAAnF server (200B2) may include less or more number of components. Further, the labels or names of the components are used only for illustrative purpose and does not limit the scope of the present disclosure. One or more components can be combined to perform the same or substantially similar function to enable the AKMA services in a roaming mode in the wireless network.

Figure 3:
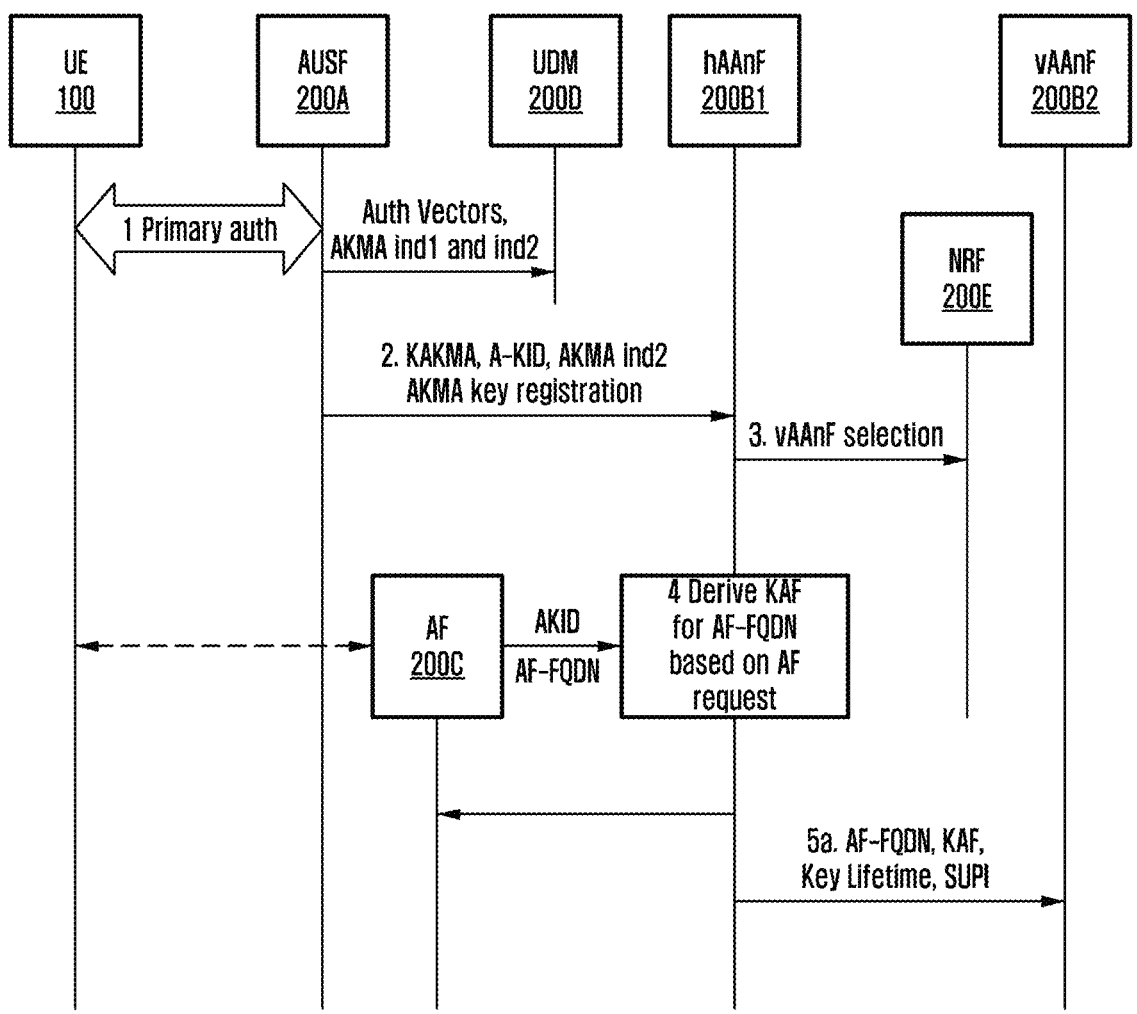
FIG. 3 is a signaling diagram illustrating provided AKMA application key notification to AAnF in visited network, by the AAnF in home network, according to the embodiments as disclosed herein.

FIG. 3 is a signaling diagram illustrating provided AKMA Application key notification to AAnF in visited network, by the AAnF in home network, according to the embodiments as disclosed herein.

Referring to the FIG. 3 consider a provided method, provides a scenario of Notification to the vAAnF (200B2) by the hAAnF whenever new KAF is derived in HN.

Step 1#, the UE (100) registers to the network and primary authentication takes place. During primary authentication, UDM provides AUSF with "AKMA Indication 1," specifying whether the AKMA Keys need to be generated for the UE.

In an embodiment, UDM also provides AUSF with "AKMA Indication 2," specifying whether the generated AKMA Keys need to be propagated to the Visited-PLMN, depending on operator agreements and/or AKMA support in VPLMN.

Step 2#, the AUSF generates KAKMA and A-KID. Correspondingly, KAKMA and A-KID are generated in the ME as well. AUSF selects an AAnF instance to serve the UE, and registers SUPI, KAKMA and A-KID in hAAnF (home AAnF). In an embodiment, AUSF provides hAAnF with "AKMA Indication 2," specifying whether the generated AKMA Keys need to be propagated to the Visited-PLMN. AUSF can decide this based on indication from UDM in Step #1 and/or local policy. AUSF also provides Visited-Network information to the hAAnF (for illustrative purpose, the Visited-Network information can be Serving Network Identity, IP address or FQDN of the AAnF).

In another embodiment, the AUSF identifies whether the generated AKMA keys need to be propagated to the Visited-PLMN based on the serving network name/ID in the primary authentication request message from the AMF (Nausf_UEAuthentication_Authenticate Request). The AUSF may have local policy configured on whether to propagate to the Visited-PLMN (based on SN-name/ID).

Step #3: In an embodiment, hAAnF discovers the vAAnF (200B2) instance information, responsible for receiving AKMA key material. hAAnF uses visited network information provided by AUSF in Step (2) to query the NRF.

The information can be a notification endpoint registered by the vAAnF (200B2) in the NRF (200E). Alternatively, the information can be a new or existing service exposed by the vAAnF (200B2) and registered in NRF (200E), for receiving AKMA Key material. Alternatively, the vAAnF (200B2) information can be queried by the AUSF (200A) from the serving AMF in the visited network, and provided to hAAnF (200B1). Another alternative can be the vAAnF (200B2) information (for example, IP address or FQDN) can be acquired by the AUSF (200A) from a local configuration or from other NF like the NRF (200E).

Step #4: The hAAnF generates KAF, triggered by a request from AF (either directly or via NEF), which in-turn may have been triggered by the UE communication with AF over Ua* interface.

Step #5: The hAAnF provides the KAF and key lifetime to AF. Additionally, at Step #5a, in an embodiment, hAAnF sends a notification to the vAAnF (200B2) whenever a new KAF is generated, providing the new KAF with KAF, key lifetime, AF-Identity (e.g., FQDN) and SUPI of the UE. Alternatively, the hAAnF sends a notification to the vAAnF (200B2) whenever a new KAF is generated, providing the new KAF with KAKMA in use (if KAKMA is not shared early) and/or AF-Identity (keys derived for which AF).

Thus, the visited-network has access to the keys used in encrypting the communication between the AF and the UE, and can provide the keys to regulatory authorities for the LI purpose.

Figure 4:
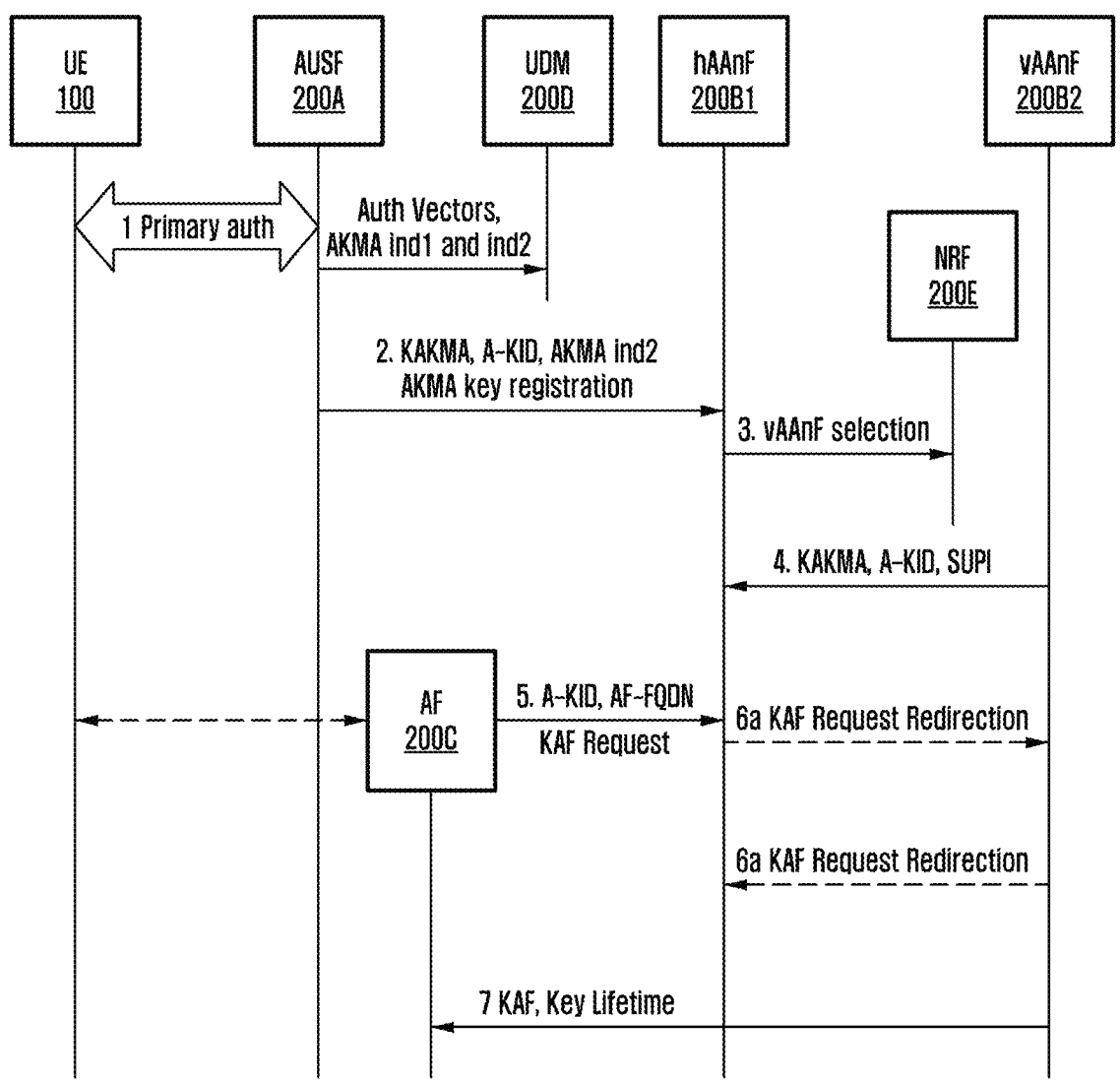
FIG. 4 is a signaling diagram illustrating provided AKMA anchor key notification to AAnF in visited network, by the AAnF in home network, according to the embodiments as disclosed herein.

FIG. 4 is a signaling diagram illustrating provided AKMA anchor key notification to AAnF in visited network, by the AAnF in home network according to the embodiments as disclosed herein.

Referring to the FIG. 4 consider a provided method, provides a scenario of pushing AKMA context to the vAAnF (200B2) and also AF request redirection to the visited/serving network.

Step #1: The UE (100) registers to the network and primary authentication takes place. During primary authentication, the UDM (200D) provides the AUSF with "AKMA Indication 1," specifying whether the AKMA Keys need to be generated for the UE (100).

In an embodiment, the UDM (200D) also provides the AUSF with "AKMA indication 2," specifying whether the generated AKMA Keys need to be propagated to the Visited-PLMN, depending on operator agreements and/or AKMA support in the VPLMN.

The AUSF generates the KAKMA and the A-KID. Correspondingly, the KAKMA and the A-KID are generated in the ME as well.

Step #2: The AUSF selects an AAnF Instance to serve the UE (100), and registers the SUPI, the KAKMA and the A-KID in the hAAnF (200B1) (home AAnF).

In an embodiment, the AUSF (200A) provides the hAAnF (200B1) with "AKMA Indication 2," specifying whether the generated AKMA Keys need to be propagated to the Visited-PLMN (200B2). The AUSF (200A) can decide this based on indication from the UDM (200D) in Step #1 and/or local policy. The AUSF (200A) also provides Visited-Network information to the hAAnF (200B1).

Step #3: In an embodiment, the hAAnF (200B1) discovers the vAAnF instance information, responsible for receiving the AKMA key material. The hAAnF (200B1) uses the visited network information provided by the AUSF (200A) in Step #2 to query the NRF (200E).

The information can be a notification endpoint registered by the vAAnF (200B2) in the NRF (200E). Alternatively, the information can be a new or existing service exposed by the vAAnF (200B2), and registered in NRF, for receiving AKMA key material containing, e.g., KAKMA, A-KID and SUPI of the UE.

Alternatively, the vAAnF (200B2) information can be queried by the AUSF (200A) from the serving AMF in visited network, and provided to the hAAnF (200B1). At Step #4, the hAAnF (200B1) sends a message to the vAAnF (200B2) whenever a new KAKMA is generated in the hAAnF (200B1), providing the vAAnF (200B2) with the KAKMA, the A-KID and the SUPI of the UE (100).

The vAAnF (200B2) may provide a re-direction information to the hAAnF (200B1) in response to this message. The re-direction information may contain, e.g., vAAnF URL, and/or URL of NEF in visited network, and any other information, which may be used by NEF in visited network to select the vAAnF (200B2).

Step #5: The AF sends a request hAAnF (directly or via NEF) to provide KAF, triggered by the UE communication with AF over Ua* interface. The request contains AF-Identity (e.g., FQDN) and A-KID.

At this point of time, at Step #6, in an embodiment, the hAAnF (200B1) re-directs the request to the vAAnF (200B2) using the re-direction information received in Step #4. It may use existing http redirection mechanisms to achieve the same.

Alternatively, as shows in Step #6a, in an embodiment, the hAAnF (200B1) assumes the role of AF-broker, and forwards the request to the vAAnF (200B2) on behalf of AF (200C). The request can be sent utilizing an existing or new service exposed by the vAAnF (200B2), registered in the NRF (200E). The hAAnF (200B1) can discover this service by querying the NRF (200E).

Step #7: The vAAnF (200B2) generates the KAF and provides the KAF and Key lifetime to the AF (200C) (directly or via hAAnF (200B2)).

Thus, since the required key material is generated in visited network itself, the visited-network has access to the keys used in encrypting the communication between the AF (200C) and the UE (100), and can provide the keys to regulatory authorities for the LI purpose.

Figure 5:
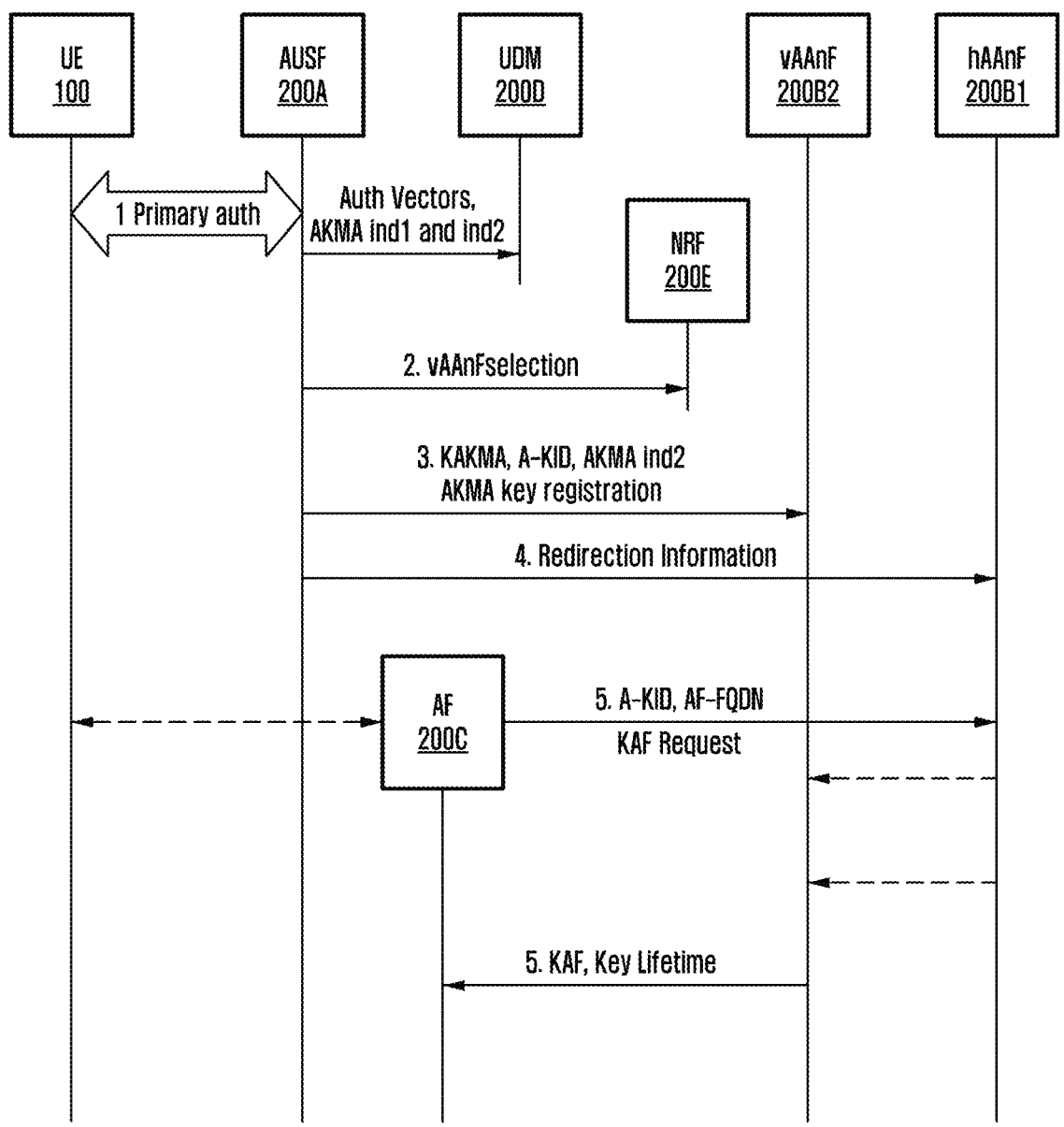
FIG. 5 is a signaling diagram illustrating provided AKMA anchor key registration in AAnF in visited network, by the AUSF in home network, according to the embodiments as disclosed herein.

FIG. 5 is a signaling diagram illustrating the provided AKMA anchor key registration in the AAnF in visited network, by the AUSF (200A) in the home network, according to the embodiments as disclosed herein.

Referring to the FIG. 5 consider the provided method, provides a scenario of the AUSF (200A) pushes the KAKMA to the vAAnF (200B2) and redirection information to the hAAnF (200B1). At Step #1, The UE (100) registers to the network and primary authentication takes place. During primary authentication, the UDM (200D) provides the AUSF (200A) with "AKMA Indication 1," specifying whether the AKMA Keys need to be generated for the UE (100).

In an embodiment, the UDM (200D) also provides the AUSF (200A) with "AKMA Indication 2," specifying whether the generated AKMA Keys need to be propagated to the Visited-PLMN, depending on operator agreements and/or AKMA support in the VPLMN.

The AUSF (200A) generates the KAKMA and the A-KID. Correspondingly, the KAKMA and the A-KID are generated in the ME as well.

Step #2: The AUSF (200A) selects the visited and the home AAnF instances (hAAnF and the vAAnF (200B2)) to serve the UE (100).

In an embodiment, the AUSF (200A) determines that the generated AKMA keys need to be propagated to the Visited-PLMN based on indication from UDM (200D) in Step #1 and/or local policy. Accordingly, the AUSF (200A) discovers the vAAnF instance information, responsible for receiving AKMA key material in the visited PLMN. The AUSF (200A) uses visited network information provided by AMF during registration procedure to query the NRF (200E).

The vAAnF instance information can be a notification endpoint registered by the vAAnF (200B2) in NRF. Alternatively, the information can be a new or existing service exposed by the vAAnF (200B2) for receiving AKMA key material containing, e.g., KAKMA, A-KID and SUPI of the UE.

Step #3: AUSF registers SUPI, KAKMA and A-KID in the vAAnF (200B2). In an embodiment, the vAAnF (200B2) may provide re-direction information to AUSF in response to this message. The re-direction information may contain, e.g., vAAnF URL, and/or URL of NEF in visited network, and any other information, which may be used by NEF in visited network to select the vAAnF (200B2).

Step #4: In an embodiment, the AUSF (200A) sends redirection information received in Step (3) to hAAnF (200B1). Alternatively, the AUSF (200A can provide visited-network information to the hAAnF (200B1), and the hAAnF (200B1) can discover the vAAnF (200B2) information by querying the NRF (200E). At Step #5, the AF (200C) sends a request the hAAnF (200B1) (directly or via NEF) to provide KAF, triggered by the UE (100) communication with AF (200C) over the Ua* interface. The request contains AF-Identity (e.g., FQDN) and the A-KID.

Step #6: At this point of time, in an embodiment, the hAAnF (200B1) re-directs the request to the vAAnF (200B2) using the re-direction information received in Step (4). It may use existing http redirection mechanisms to achieve the same.

Alternatively, as shows in Step #6a, in an embodiment, the hAAnF (200B1) assumes the role of AF-broker, and forwards the request to the vAAnF (200B2) on behalf of the AF (200C). The request can be sent utilizing an existing or new service exposed by the vAAnF (200B2), registered in the NRF (200E. hAAnF can discover this service by querying NRF. Then, at Step #7, the vAAnF (200B2) generates the KAF and provides the KAF and the key lifetime to the AF (200C) (directly or via hAAnF). Thus, since the required key material is generated in visited network itself, the visited-network has access to the keys used in encrypting the communication between the AF (200C) and the UE (100), and can provide the keys to regulatory authorities for the LI purpose.

Figure 6:
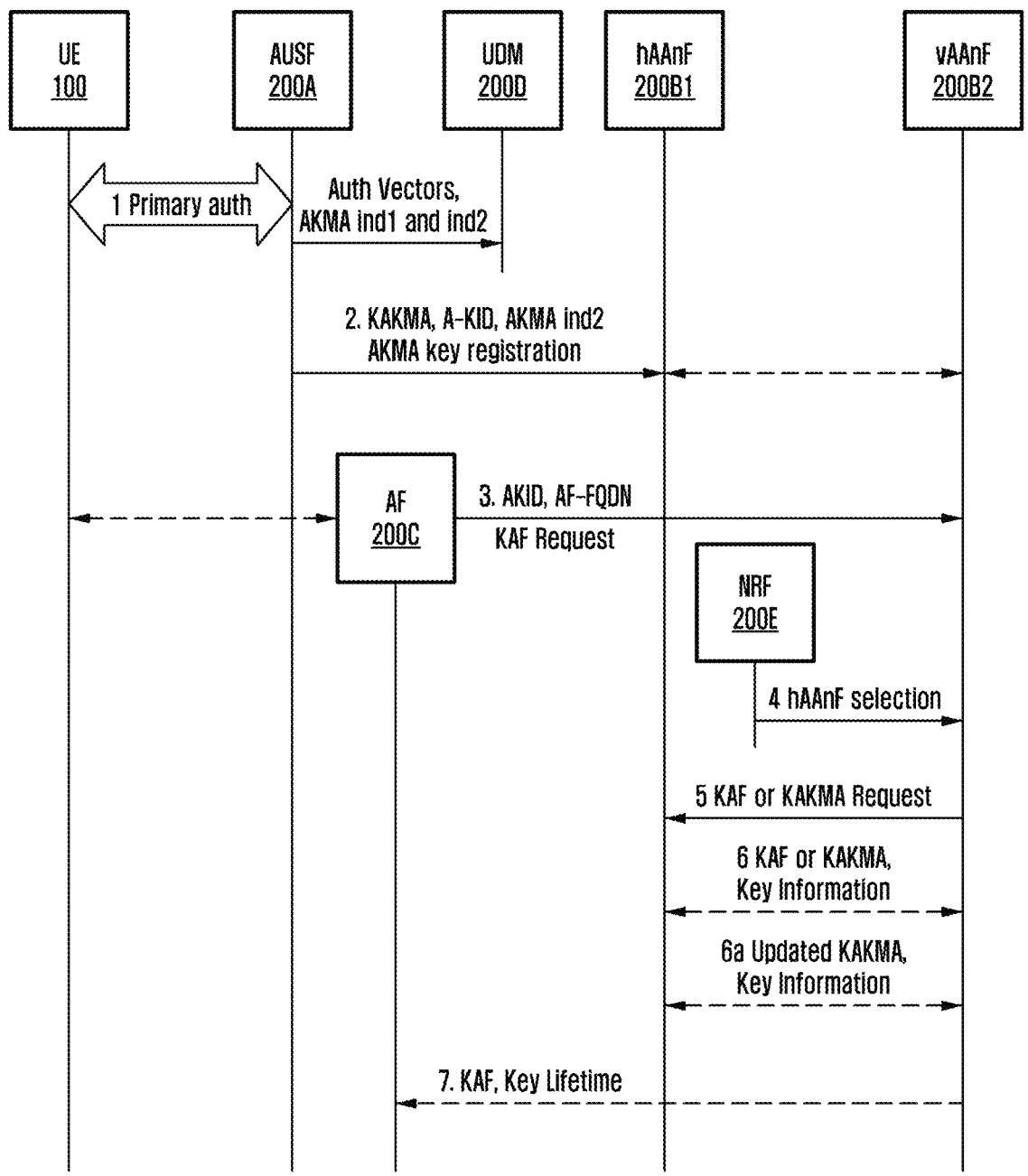
FIG. 6 is a signaling diagram illustrating provided AKMA anchor key or AKMA application key retrieval by AAnF in visited network, from the AAnF in home network, according to the embodiments as disclosed herein.

FIG. 6 is a signaling diagram illustrating provided AKMA anchor key or AKMA application key retrieval by the AAnF in visited network, from the AAnF in home network, according to the embodiments as disclosed herein.

Referring to the FIG. 6 consider a provided method, provides a scenario, where the AF (200C) contacts the vAAnF (200B2) for KAF, the vAAnF (200B2) pulls keys from the hAAnF (200B1). Below are the steps are given in detail.

Step #1: The UE (100) registers to the network and primary authentication takes place. During primary authentication, the UDM (200D) provides the AUSF (200A) with "AKMA Indication 1," specifying whether the AKMA Keys need to be generated for the UE (100).

In an embodiment, the UDM (200D) also provides the AUSF (200A) with "AKMA Indication 2," specifying whether the generated AKMA Keys can be propagated to the Visited-PLMN, depending on operator agreements and/or AKMA support in the VPLMN.

Step #2: The AUSF (200A) generates the KAKMA and the A-KID. Correspondingly, the KAKMA and the A-KID are generated in the ME as well.

The AUSF (200A) selects an AAnF Instance to serve the UE (100), and registers the SUPI, the KAKMA and the A-KID in hAAnF (home AAnF) (200B1).

In an embodiment, the AUSF (200A) provides the hAAnF (200A) with "AKMA Indication 2," specifying whether the generated AKMA Keys can be propagated to the Visited-PLMN. The AUSF (200A) can decide this based on indication from the UDM (200D) in Step (1) and/or local policy. The AUSF (200A) also provides Visited-Network information to the hAAnF (200B1).

Additionally, optionally, the hAAnF (200B1) can discover an AAnF in visited network and push KAF key material to the vAAnF (200B2) as described in Solution (1), or KAKMA key material to the vAAnF (200B2) as described earlier.

Step #3: The UE (100) triggers communication over the Ua* interface with AF (200C) based on necessary application of the UE. In an embodiment, UE (100) optionally provides visited-network information (e.g., Serving PLMN ID) to the AF (200C) along with A-KID. Based on local configuration, and/or presence of visited-network information in the UE (100) request, the AF (200C) sends a request the vAAnF (200B2) (directly or via NEF) to provide KAF. The request contains AF-Identity (e.g., FQDN) and A-KID.

Step #4: Based on information contained in A-KID (routing ID, home network information), the vAAnF (200B2) discovers the hAAnF (200B1) by querying NRF (200E).

Step #5: The vAAnF (200B2) requests the hAAnF (200B1) to provide the AKMA key material. The request can be sent utilizing a new or existing service exposed by the hAAnF (200B1), and discovered by the vAAnF (200B2) via the NRF (200E). The request contains following information:

Whether request is for KAKMA or KAF and the A-KID of the UE (100) as provided by the AF (200C). If the request is for KAF, AF-Identity (e.g., FQDN) provided by the AF (200C). If the request is for KAKMA, optionally a call-back URL, specifying the endpoint where notifications may be sent whenever a new KAKMA is generated.

Step #6: Based on received request, and/or local policy, and/or UDM provided "AKMA Indication 2," hAAnF either provides KAKMA key material to vAAnF, or the hAAnF generates KAF key material from KAKMA and AF-Identity (e.g., FQDN), and provides to vAAnF.

Step #6a: Also, whenever new KAKMA is generated, it may be provided to vAAnF on the notification endpoint received in Step (5).

Step #7: Based on the received information, if vAAnF receives KAF and key lifetime, the vAAnF provides the same to AF. Else, if the vAAnF receives KAKMA, the vAAnF generates KAF from KAKMA and AF-Identity (e.g., FQDN), and provides to the AF (200C).

Thus, the visited-network has access to the keys used in encrypting the communication between the AF (200) and the UE (100), and can provide the keys to regulatory authorities for the LI purpose.

Figure 7:
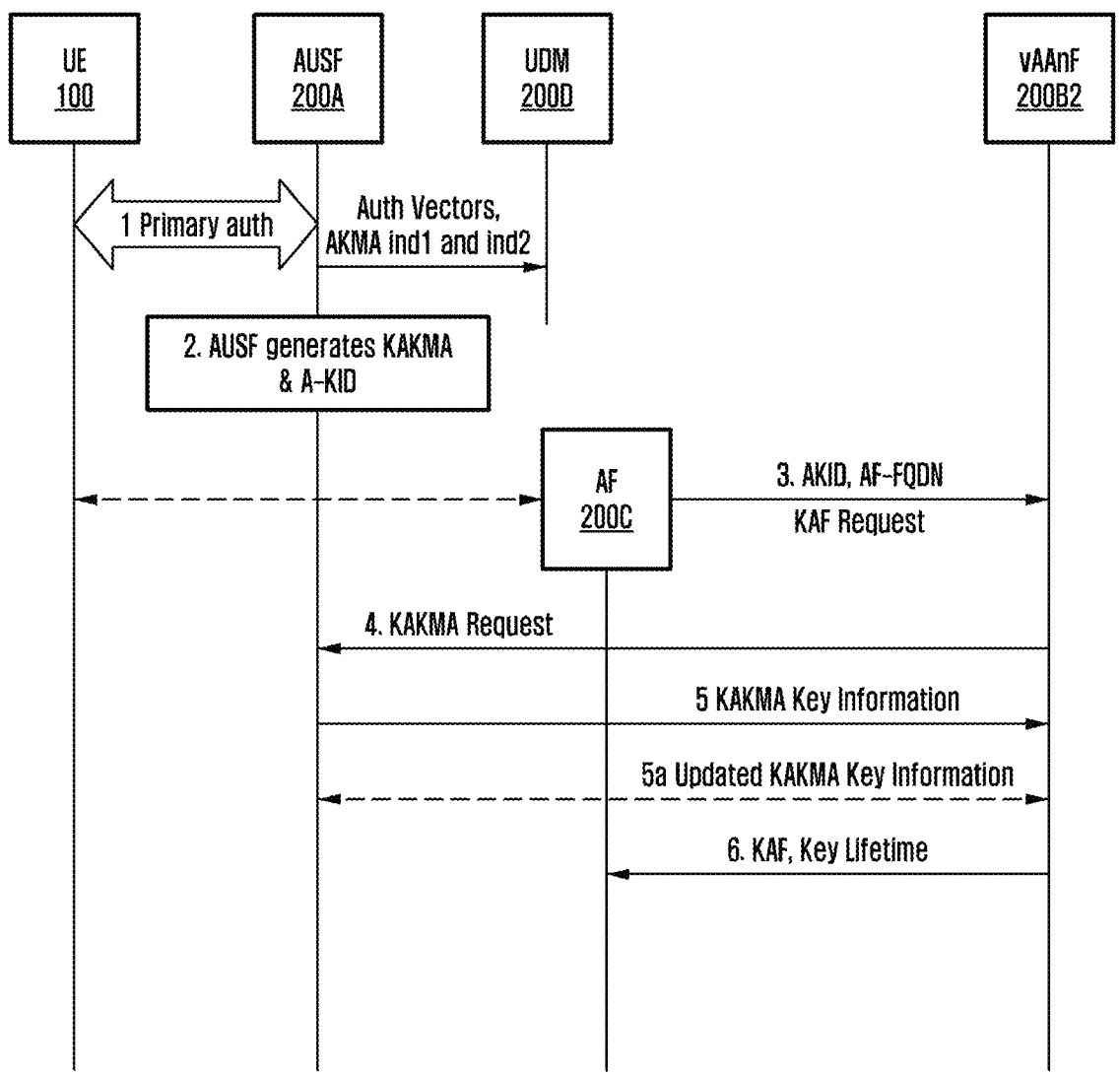
FIG. 7 is a signaling diagram illustrating provided AKMA Anchor key retrieval by AAnF in visited network, from the AUSF in home network, according to the embodiments as disclosed herein.

FIG. 7 is a signaling diagram illustrating provided AKMA anchor key retrieval by the AAnF in visited network, from the AUSF (200A) in home network, according to the embodiments as disclosed herein.

Referring to the FIG. 7 consider a provided method, provides a scenario of the AF (200C) contacts the vAAnF (200B2) for the KAF, the vAAnF (200B2) pulls keys from the AUSF (200A). Below are the steps given in detail.

Step #1: The UE (100) registers to the network and primary authentication takes place. During primary authentication, the UDM (200D) provides the AUSF (200A) with "AKMA Indication 1," specifying whether the AKMA Keys need to be generated for the UE (100).

In an embodiment, the UDM (200D) also provides the AUSF (200A) with "AKMA Indication 2," specifying whether the generated AKMA Keys can be propagated to the Visited-PLMN, depending on operator agreements and/or AKMA support in VPLMN.

Step #2: The AUSF (200A) generates the KAKMA and the A-KID and stores locally in UE-Context. The UE's (100) presence in V-PLMN, as learnt by the AUSF (100A) during primary authentication procedure, makes the AUSF (100A) know that the AUSF does not need to store the KAKMA in the home-AAnF (200B1). Correspondingly, the KAKMA and the A-KID are generated in the ME as well.

Based on local policy, and/or the UDM (200D) provided "AKMA Indication 2," the AUSF (100A) provides KAKMA key material to the vAAnF (200B2) (without any request from the vAAnF (200B2)).

Step #3: The UE (100) triggers communication over the Ua* interface with the AF (200C) based on necessary application of the UE. In an embodiment, the UE (100) optionally provides visited-network information (e.g., serving PLMN ID) to the AF (200C) along with the A-KID (or alternatively, the A-KID is constructed/derived based on the serving PLMN ID and additionally home network information optionally included). Based on local configuration, and/or presence of visited-network information in the UE (100) request, the AF (200C) sends a request to the vAAnF (200B2) (directly or via NEF) to obtain KAF. The request contains the AF-Identity (e.g., FQDN) and the A-KID.

Step #4: Based on information contained in the A-KID (routing ID, home network information), and other local information, the vAAnF (200B2) discovers the AUSF (200A) (e.g., by querying NRF) and sends a request to the AUSF (200A) to provide the AKMA key material, if there is no AKMA context available in the vAAnF (200B2) (for example, the may obtained the AKMA security context in Step-2). The request can be sent utilizing a new or existing service exposed by the AUSF (200A), and learnt by the vAAnF (200B2) via the NRF (200E). The request contains following information: The A-KID of the UE (100) as provided by the AF (200C).

Optionally a call-back URL, specifying the endpoint where notifications may be sent whenever a new KAKMA is generated.

In an embodiment, the vAAnF (200B2) returns an error to the AF (200C), if the AKMA context for the UE (100) is not available, as in Step (2) the AUSF (200A) may have provided the AKMA security context to the vAAnF (200B2) if the UE (100) successfully completed the primary authentication procedure. In an embodiment, if the step (2) is mandatory to support and there is no new or existing service exposed by the AUSF (200A) for key request from the AAnF, then Step (4) and Step (5) are skipped.

Step #5: Based on the received request, and/or local policy, and/or the UDM (200D) provided "AKMA Indication 2," the AUSF (200A) provides the KAKMA key material to the vAAnF (200B2). Also, as shows in Step #5a, whenever new KAKMA is generated, the new KAKMA may be provided to the vAAnF (200B2) on the notification endpoint received in Step (4).

Step #6: Based on the received information, the vAAnF (200B2) generates the KAF from the KAKMA and the AF-Identity (e.g., FQDN), and provides to AF (200C).

Thus, the visited-network has access to the keys used in encrypting the communication between the AF (200C) and the UE (100), and can provide the keys to regulatory authorities for the LI purpose.

Figure 8:
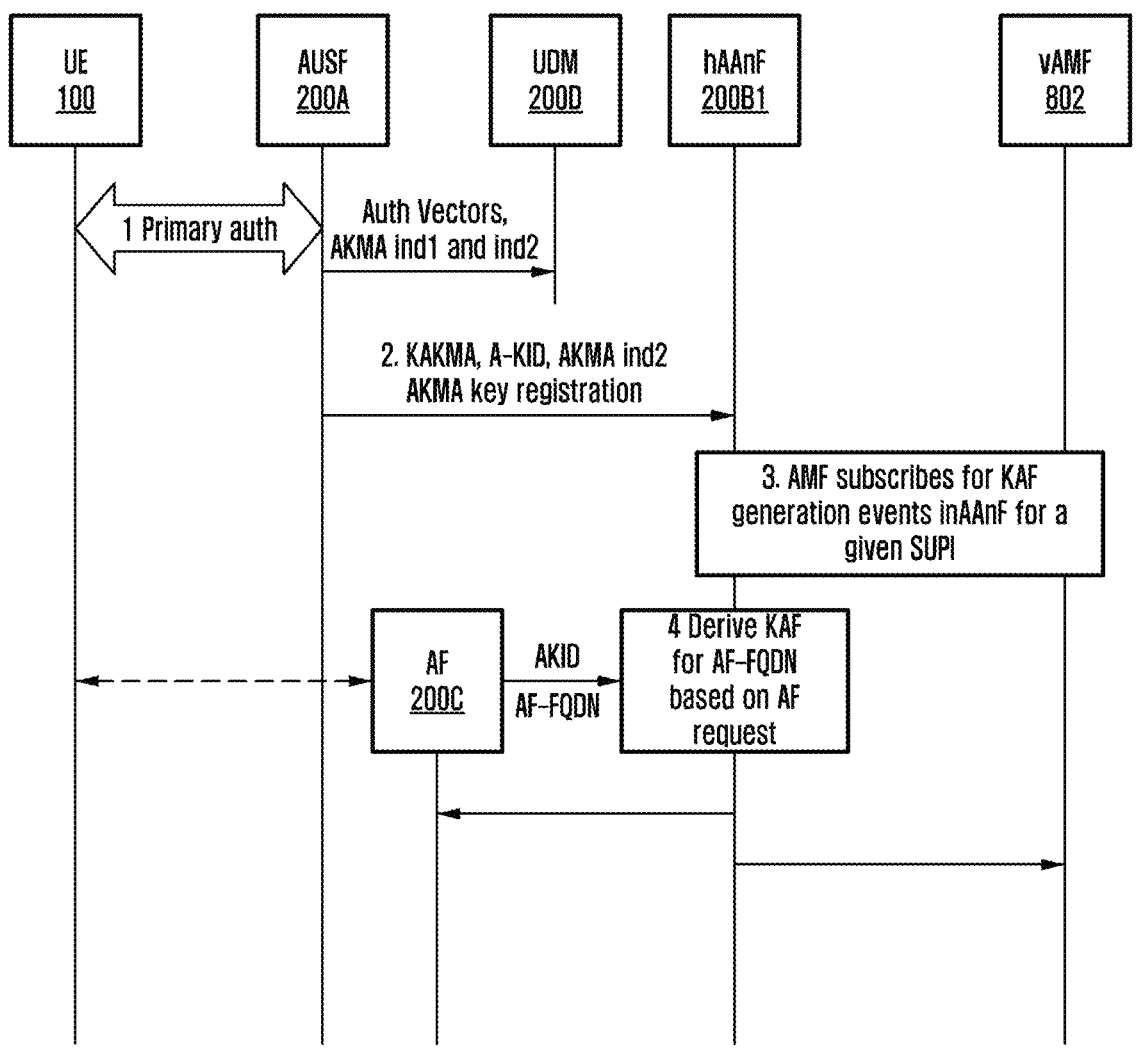
FIG. 8 is a signaling diagram illustrating provided AKMA Application key notification to AMF in serving network, by the AAnF in home network, according to the embodiments as disclosed herein.

FIG. 8 is a signaling diagram illustrating provided AKMA application key notification to AMF in serving network, by the AAnF in home network, according to the embodiments as disclosed herein.

Referring to the FIG. 8 consider a provided method, provides a scenario of AMF Subscribes to KAF Generation Event in AAnF. Below are the steps given in detail.

Step #1: The UE (100) registers to the network and primary authentication takes place. During primary authentication, the UDM (200D) provides the AUSF (200A) with "AKMA Indication 1," specifying whether the AKMA Keys need to be generated for the UE (100).

In an embodiment, the UDM (200D) also provides the AUSF (200A) with "AKMA Indication 2," specifying whether the generated AKMA Keys can be propagated to the Visited-PLMN, depending on operator agreements and/or AKMA support in VPLMN.

As part of authentication response, in case of success, in an embodiment, the AUSF (200A) also informs AMF in visited-network that AKMA keys are (to be) generated for the UE (100).

Step #2: The AUSF (200A) generates the KAKMA and the A-KID. Correspondingly, the KAKMA and the A-KID are generated in the ME as well.

The AUSF (200A) selects the AAnF instance to serve the UE (100), and registers the SUPI, the KAKMA and the A-KID in hAAnF (200B1) (home AAnF).

In an embodiment, the AUSF (200A) provides the hAAnF (200B1) with "AKMA Indication 2," specifying whether the generated AKMA Keys need to be propagated to the Visited-PLMN. The AUSF (200A) can decide this based on indication from the UDM (200D) in Step #1 and/or local policy.

Step #3: In an embodiment, the AMF subscribes to KAF generation events in the hAAnF (200B1). This can be achieved by following methods.

In one embodiment, the AMF can query the NRF (200E) and get details of AAnF responsible for serving the UE (100). The details discovered include the aAnF Service details providing subscription service for KAF generation events. In an embodiment, the AAnF registers a new service in NRF (200E) to manage these subscriptions, allowing NF-Consumers (e.g., AMF) to discover and subscribe.

The AMF then sends a subscription request to hAAnF (200B1) providing a call-back URL on which the KAF key material can be sent.

The AMF can provide the hAAnF (200B1) (e.g., via AUSF) with a call-back URL on which KAF key material can be sent as-part-of or after primary authentication procedure.

Step #4: The hAAnF (200B1) generates KAF, triggered by a request from the AF (200C) (either directly or via NEF), which in-turn may have been triggered by the UE (100) communication with the AF over Ua* interface.

Step #5: The hAAnF (200B1) provides the KAF and key lifetime to AF (200C). Additionally, in an embodiment, the hAAnF (200B1) sends a notification to vAMF whenever a new KAF is generated, providing the KAF with KAF, key lifetime, AF-Identity (e.g., FQDN) and SUPI of the UE (100).

The vAMF stores the received information in UE-context, and provides the received information to regulatory authorities when/if queried for LI purpose. The vAMF may un-subscribe from receiving these notifications post de-registration of the UE (100).

Thus, the visited-network has access to the keys used in encrypting the communication between the AF (200*c*) and the UE (100), and can provide the keys to regulatory authorities for the LI purpose.

Figure 9:
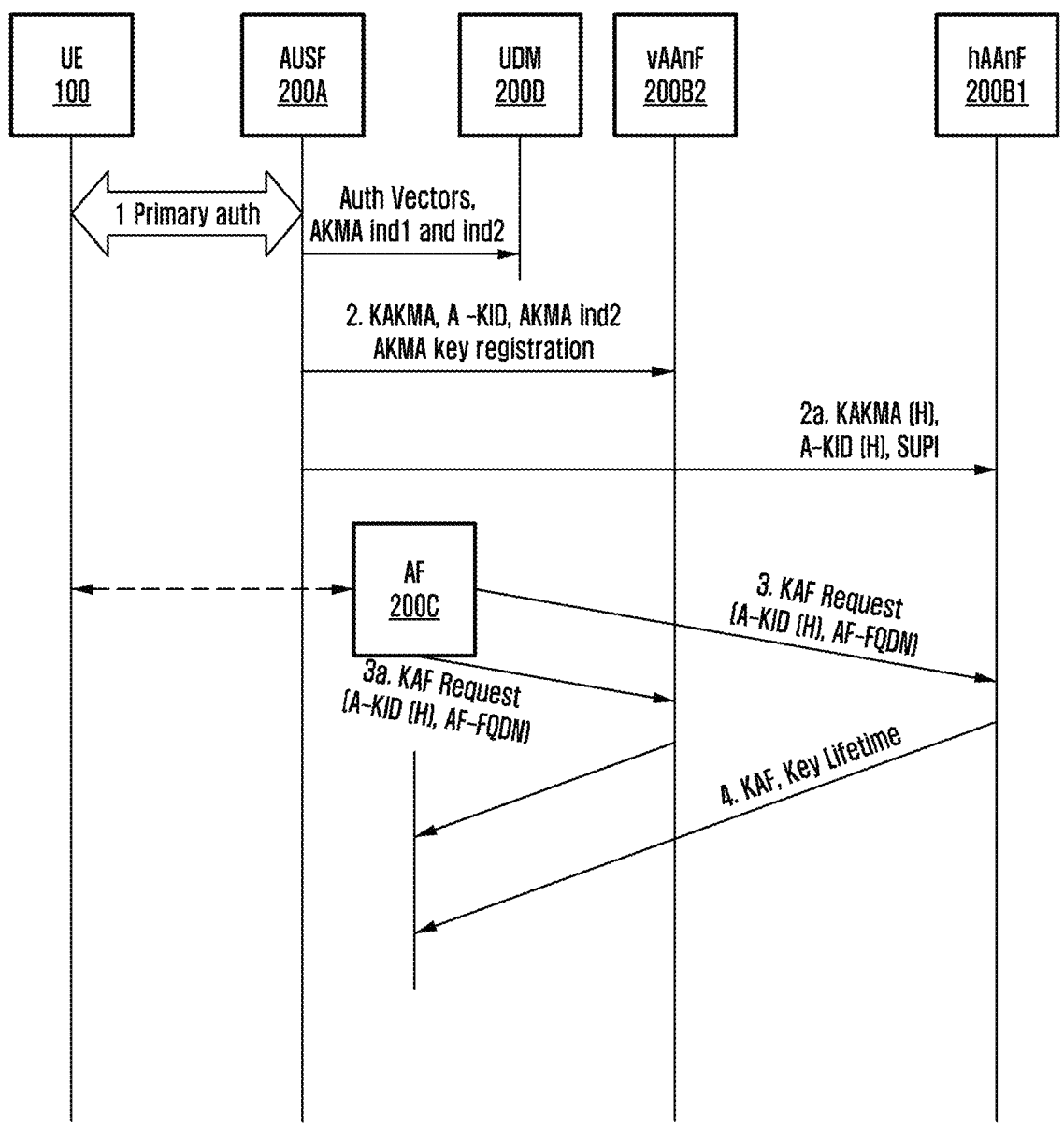
FIG. 9 is a signaling diagram illustrating provided cryptographically separate AKMA anchor key notifications to vAAnF and hAAnF, by the AUSF in home network, according to the embodiments as disclosed herein.

FIG. 9 is a signaling diagram illustrating provided cryptographically separate AKMA anchor key notifications to the vAAnF (200B2) and the hAAnF (200B1), by the AUSF (200A) in the home network, according to the embodiments as disclosed herein.

Referring to the FIG. 9 consider a provided method, provides a scenario of cryptographic Separation of the AKMA Keys. Below are the steps given in detail.

Step #1: The UE (100) registers to the network and primary authentication takes place. During primary authentication, the UDM (200D) provides the AUSF (200A) with the "AKMA Indication 1," specifying whether the AKMA Keys need to be generated for the UE (100).

In an embodiment, the UDM (200D) also provides the AUSF (200A) with the "AKMA Indication 2," specifying whether the generated AKMA Keys can be propagated to the VPLMN, depending on operator agreements and/or AKMA support in the VPLMN.

Step #2: The AUSF (200A) provides the AKMA key material to the hAAnF (200B1) and also to the vAAnF (200B2) (based on the SN ID in the authentication request). The KAKMA key provided to the hAAnF (200B1) and the vAAnF (200B2) are cryptographically different. In an embodiment, the cryptographically separate KAKMA keys are derived by including the SN name/ID in the KAKMA derivation. The KAKMA=KDF (KAUSF, FC, "AKMA," the SUPI, SN-ID).

Correspondingly, the KAKMA and the A-KID are generated in the ME as well. In an embodiment, the UE (100) constructs the A-KID based on the SN PLMN ID and/or using the HPLMN ID (based on the AF/service configuration). For example, the AF (200C) (may configure the ME to generate A-KID using HPLMN ID, whereas another AF (200C) may configure the ME to generate the A-KID using the VPLMN ID. Application in the UE (100) may pass this information to AKMA functionality handling layer within the UE (100). Alternatively, this may be based on AF-FQDN formed by the UE (100) using visited or home network IDs. In another embodiment, the UE (100) may always use the SN ID to generate A-KID and the KAKMA key derived using the SN ID. If the AAnF is not reachable for the AF (200C), then the AF (200C) provides error indication in response to the UE's request over Ua* interface. On receiving the error response, the UE (100) initiate the request again using the HN ID and the key derived using the HN ID. In another embodiment, the UE (100) may always use the HN ID and the key derived using the HN ID first and then on receiving the error response, the UE (100) may use the SN ID and the key derived using the SN ID.

The AUSF (200A) may provide the KAKMA key material to vAAnF (200B2) based on local policy, and/or the UDM (200D) provided "AKMA Indication 2" (without any request from the vAAnF (200B2)).

Step #3, 3*a*: The UE (100) triggers communication over the Ua* interface with the AF (200C) based on necessary application of the UE and provides the A-KID as specified in Step #2. The AF (200C) accordingly sends a request to the vAAnF (200B2) or the hAAnF (200B1) to obtain the KAF. The request contains AF-Identity (e.g., FQDN) and A-KID.

Step #4: Depending on the AAnF contacted by AF (200C) in step (3/3*a*), the hAAnF (200B1) or the vAAnF (200B2) provides the KAF key material to the AF (200C).

Thus, the visited-network has access to the keys used in encrypting the communication between the AF (200C) and the UE (100), and can provide the keys to regulatory authorities for the LI purpose.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network entity for enabling authentication and key management application (AKMA) services in a roaming mode of a user equipment (UE), the method comprising:
    generating at least one key associated with the AKMA services after performing a primary authentication of the UE with the network entity;
    transmitting, to a home AKMA anchor function (hAAnF), a first request message to register the at least one key associated with the AKMA services;
    identifying whether the UE is roaming based on a serving network (SN) name which is received previously in the primary authentication; and
    transmitting, to a visited AKMA anchor function (vAAnF), a second request message to register the at least one key associated with the AKMA services in case that the UE is identified as roaming based on the SN name.

2. The method as claimed in claim 1,
    wherein requests are transmitted from the vAAnF to the hAAnF to provide the at least one key associated with the AKMA services, and
    wherein the requests comprise at least one of an AKMA key identifier of the UE provided by an AF (application function), or an AF-identity provided by the AF.

3. The method as claimed in claim 2,
    wherein the hAAnF provides the at least one key associated with the AKMA services to the vAAnF in response to the requests.

4. The method as claimed in claim 1, the at least one key associated with the AKMA services is transmitted from the hAAnF to the vAAnf in case that a new key associated with the AKMA services is generated by the hAAnF.

5. The method as claimed in claim 1, wherein the at least one key associated with the AKMA services comprises an AKMA anchor key.

6. The method as claimed in claim 5, further comprising:
    generating an AKMA key identifier corresponding to the AKMA anchor key.

7. An authentication server function (AuSF) server for enabling authentication and key management for applications (AKMA) services in a roaming mode of a user equipment (UE), the AuSF server comprising:
  memory;
  a processor; and
  an AKMA controller, operably connected to the memory and the processor, configured to:
    generate at least one key associated with the AKMA services after performing a primary authentication of the UE with the AuSF server,
    transmit, to a home AKMA anchor function (hAAnF), a first request message to register the at least one key associated with the AKMA services,
    identify whether the UE is roaming based on a serving network (SN) name which is received previously in the primary authentication, and
    transmit, to a visited AKMA anchor function (vAAnF), a second request message to register the at least one key associated with the AKMA services in case that the UE is identified as roaming based on the SN name.

8. The AuSF server as claimed in claim 7,
  wherein requests are transmitted from the vAAnF to the hAAnF to provide the at least one key associated with the AKMA services, and
  wherein the requests comprise at least one of an AKMA key identifier of the UE provided by an AF (application function), or an AF-identity provided by the AF.

9. The AuSF server as claimed in claim 8,
  wherein the hAAnF provides the at least one key associated with the AKMA services to the vAAnF in response to the requests.

10. The AuSF server as claimed in claim 7, wherein the the at least one key associated with the AKMA services is transmitted from the hAAnF to the vAAnF in case that a new key associated with the AKMA services is generated by the hAAnF.

11. The AuSF server as claimed in claim 7, wherein the at least one key associated with the AKMA services comprises an AKMA anchor key.

12. The AuSF server as claimed in claim 11, wherein the processor is further configured to generate an AKMA key identifier corresponding to the AKMA anchor key.

* * * * *